US006627346B1

(12) United States Patent
Kinouchi et al.

(10) Patent No.: US 6,627,346 B1
(45) Date of Patent: Sep. 30, 2003

(54) BATTERY SEPARATOR AND LITHIUM SECONDARY BATTERY

(75) Inventors: Masayuki Kinouchi, Yamaguchi (JP); Tetsuo Akazawa, Yamaguchi (JP); Takashi Oe, Yamaguchi (JP); Ryuichiro Kogure, Yamaguchi (JP); Kenji Kawabata, Yamaguchi (JP); Yuuji Nakakita, Yamaguchi (JP)

(73) Assignee: Ube Industries, Ltd., Yamaguchi (JP)

( * ) Notice: Subject to any disclaimer, the term of this patent is extended or adjusted under 35 U.S.C. 154(b) by 74 days.

(21) Appl. No.: 09/709,623

(22) Filed: Nov. 10, 2000

(30) Foreign Application Priority Data

Nov. 10, 1999 (JP) .............................. 11-319350
Jul. 7, 2000 (JP) ........................ 2000-206731

(51) Int. Cl.⁷ .............................................. H01M 2/16
(52) U.S. Cl. ...................... 429/144; 429/251; 429/252
(58) Field of Search ................................ 429/142, 144, 429/145, 247, 249, 251, 252; 428/304.4, 315.5–315.9, 331, 329, 354, 300.7

(56) References Cited

U.S. PATENT DOCUMENTS

| 5,389,463 A | * | 2/1995 | Chang et al. | 429/142 |
|---|---|---|---|---|
| 5,691,047 A | * | 11/1997 | Kurauchi et al. | 428/315.7 |
| 6,080,507 A | * | 6/2000 | Yu | 429/62 |
| 6,245,270 B1 | * | 6/2001 | Mizutani et al. | 264/154 |
| 6,387,565 B1 | * | 5/2002 | Aihara et al. | 429/145 |
| 6,428,933 B1 | * | 8/2002 | Christensen et al. | 429/231.95 |

FOREIGN PATENT DOCUMENTS

| GB | 2298817 A | * | 9/1996 |
|---|---|---|---|
| WO | WO 94/20995 | * | 9/1994 |
| WO | WO 98/41572 | * | 9/1998 |

OTHER PUBLICATIONS

Chapter 23, Halides and Carbonates: Hydrotalcite [online], [retrieved on Apr. 9, 2003]. Pete J. Dunn, 1995. Retrieved from the Internet: <URL: http://simplethinking.com/dunn/ch23/hydrotalcite>.*

* cited by examiner

*Primary Examiner*—Susy Tsang-Foster
(74) *Attorney, Agent, or Firm*—Reed Smith LLP

(57) ABSTRACT

A battery separator favorably employable for lithium secondary battery comprises at least one porous film in which 100 to 40,000 ppm of particles of silicon dioxide, aluminum oxide, magnesium oxide, zinc oxide or metal oxides containing at least two metal elements selected from the group consisting of Si, Al, Mg and Zn having a mean diameter of 0.1 to 10 $\mu$m are dispersed in a porous resin matrix.

12 Claims, 1 Drawing Sheet

100 $\mu$m

←—→
100 μm

←—→
100 μm

BATTERY SEPARATOR AND LITHIUM SECONDARY BATTERY

FIELD OF THE INVENTION

The present invention relates to a battery separator and a lithium secondary battery. Particularly, the invention relates to a battery separator favorably employable for a lithium secondary battery and a lithium secondary battery utilizing the battery separator.

BACKGROUND OF THE INVENTION

As a battery separator or a separator for electrolytic condensers, a porous polyolefin film which is produced by stretching a polyolefin film or by subjecting a polyolefin film containing micro-particles dispersed in the film to a procedure for removing the particles from the film is generally employed.

A recently developed non-aqueous lithium secondary battery of high quality requires a battery separator having improved characteristics. In more detail, a recently developed lithium secondary battery has a high energy density, a high electromotive force, and a low self discharge. In a representative lithium secondary battery, the negative electrode is made of a lithium metal, a metal alloy of lithium and other metal element, a carbonaceous material in which lithium ions are absorbed or intercalated, for instance, graphite, or an electro-conductive material doped with lithium ions, and a positive electrode is made of a fluorinated graphite represented by $(CF_x)_n$, a metal oxide (e.g., $MnO_2$, $V_2O_5$, CuO, $Ag_2CrO_4$, $TiO_2$, $LiCoO_2$, $LiNiO_2$, or $LiMn_2O_4$), a metal sulfate, or a metal oxide.

The representative lithium secondary battery further comprises a non-aqueous electrolytic solution in which a electrolyte such as $LiPF_6$, $LiBF_4$, LiClO4, $LiCF_3SO_3$, $LiN(SO_2CF_3)_2$, or $LiN(SO_2C_2F_5)_2$ is dissolved in an organic solvent such as ethylene carbonate, propylene carbonate, butylene carbonate, dimethyl carbonate, methyl ethyl carbonate, diethyl carbonate, γ-butyrolactone, acetonitrile, 1,2-dimethoxyethane, or tetrahydrofuran.

The battery separator works to separate the positive electrode from the negative electrode so as to inhibit production of short circuit, while not disturbing the battery reaction.

Until now, various battery separators are developed. Examples of the known battery separators are given below.

A porous mono-layer film of thermoplastic resin such as polyethylene or polypropylene (see Japanese Patent Publications No. 46-40119, No. 55-32531, and No. 59-37292, Japanese Patent Provisional Publications No. 60-23954 and No. 2-75151, and U.S. Pat. No. 3,679,538).

A porous composite film comprising a number of porous polyethylene or polypropylene films (see Japanese Patent Provisional Publications No. 62-10857, No. 2-77108, No. 6-55629, No. 6-20671, and No. 7-307146).

A porous film of a resin having a high molecular weight (see Japanese Patent Provisional Publications No. 2-94356 and No. 3-105851).

A porous composite film having a support film of a thermoplastic resin or a non-woven fabric (see Japanese Patent Provisional Publications No. 3-245457 and No. 1-258358).

A porous film of polyolefin resin containing an inorganic filler in an amount of 50 to 500 weight parts per 100 weight parts of the resin material (see Japanese Patent Provisional Publication No. 62-167332).

A battery separator having a surface protective layer containing inorganic micro particles (see Japanese Patent Provisional Publication No. 11-80395).

SUMMARY OF THE INVENTION

In the course of studies on a battery separator, particularly a battery separator favorably employable for a lithium battery, the present inventors have noted that ills known battery separators cannot give satisfactory characteristics such that both of electric performance required for a battery separator and physical strengths are not simultaneously satisfied.

The present invention resides in a battery separator comprising at least one porous film in which 100 to 40,000 ppm of particles having a mean diameter in the range of 0.1 to 10 μm are dispersed in a porous resin matrix, the particles comprising at least one metal oxide selected from the group consisting of silicon dioxide, aluminum oxide, magnesium oxide, zinc oxide and their complex compounds, namely, metal oxides containing at least two metal elements selected from the group consisting of Si, Al, Mg and Zn and having an oxidation potential of +4.5 V or more as compared with that of lithium.

The battery separator of the present invention can be favorably produced by a method of producing a porous film in which 100 to 40,000 ppm, particularly 100 to 5,000 ppm, of particles having a mean diameter of 0.1 to 10 μm, particularly, 0.1 to 8 μm, are dispersed in a porous resin matrix, the particles comprising at least one metal oxide selected from the group consisting of silicon dioxide, aluminum oxide, magnesium oxide, zinc oxide and their complex compounds, which comprises stretching a resin film in which the particles of metal oxide are dispersed.

The battery separator of the invention preferably comprises a combined multi-layer film composed of one porous resin (particularly, polyethylene) film containing no solid particles and a pair of the porous resin (particularly, polypropylene) films having the above-identified metal oxide particles in which the porous resin film containing no solid particles is placed between a pair of the porous resin films having the metal oxide particles.

DETAILED DESCRIPTION OF THE INVENTION

Figure 1:
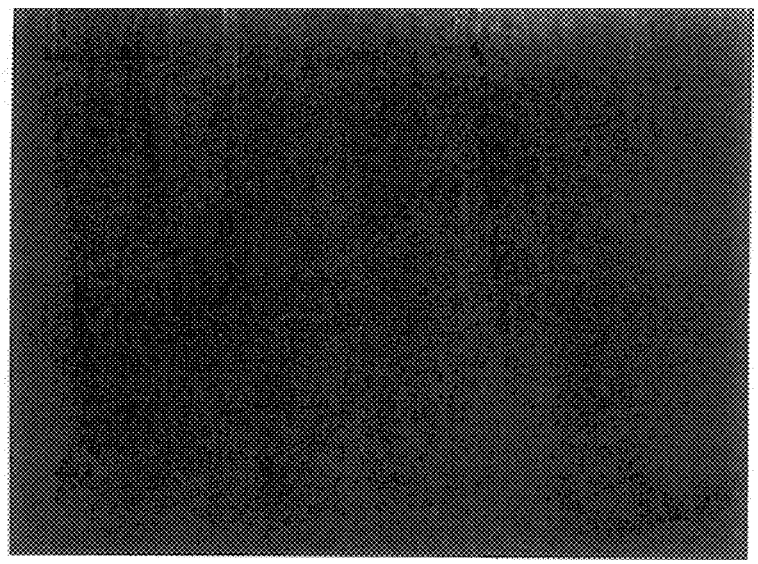
FIG. 1. indicates a photographic picture of a surface of a battery separator of the invention which has been subjected to the below-mentioned rubbing test.

The battery separator of the invention has not only satisfactory battery characteristics but also a good physical strength on its surface. The physical strength required for the battery separator surface is described below in detail.

An electrode sheet, particularly, an electrode sheet of a lithium secondary battery sometimes has a great number of protrusions of height as high as several μm on its surface. In the process for manufacturing a battery, a battery separator is placed between a positive electrode sheet and a negative electrode sheet, and thus formed composite sheet is coiled in a battery case. In this process, on the surface of the battery separator are produced scratches or other physical damages because of the protrusions of the electrode sheets. The scratches and physical damage produced on the battery separator are apt to produce short electric circuit between the positive and negative electrodes.

Therefore, a battery separator having enough physical strength, particularly enough abrasive resistance, on its surface is required.

The battery separator of the invention shows such favorable function that the metal oxide particles dispersed in the porous film can fix on their surfaces impurities such as those brought in by the resin material of the battery separator. Examples of the impurities are aromatic alcohols derived from an oxidation inhibitor and fatty acids derived from a stabilizing agent, both of which are incorporated into the resin material used for preparing the battery separator. Other examples of the impurities are alcohols, water, and free acids (e.g., HF) which are introduced into the battery by an electrolyte and a non-aqueous electrolytic solution. These impurities of certain amounts are considered to disturb electrochemical reactions occurring in the battery and hence The battery separator of the invention comprises at least one porous film in which 100 to 40,000 ppm of particles having a mean diameter in the range of 0.1 to 10 $\mu$m are dispersed in a porous resin matrix. The particles comprise a metal oxide such as silicon dioxide, aluminum oxide, magnesium oxide, zinc oxide or their complex compounds. The porous resin matrix can be produced using a resinous material such as polyolefin (preferably, polyethylene or polypropylene). Other resins also are employable.

The polyethylene can be high density polyethylene, medium density polyethylene, or low density linear polyethylene. The high density polyethylene is preferred. The polyethylene preferably has a number average molecular weight of 10,000 or more (in terms of a polystyrene-converted molecular weight), more preferably a number average molecular weight of 20,000 or more.

The polypropylene preferably has a number average molecular weight of 50,000 or more, more preferably 70,000. A ratio between a number average molecular weight and a weight average molecular weight preferably is 8 or less. The polypropylene preferably has a crystallizing temperature of 110° C. or higher, more preferably 112° C. or higher.

The metal oxide particles dispersed in the porous matrix film of the invention are particles comprising, as main ingredient, of silicon dioxide, aluminum oxide, magnesium oxide, zinc oxide and their complex compounds (e.g., aluminosilicate and hydrotalcite). The metal oxide particles preferable shows an oxidation potential of +4.5 V or more, more preferably +5 V or more as compared with that of lithium, because such high oxidation potential makes the metal oxide particles stable in the secondary battery. The oxidation potential is determined using a non-aqueous solution containing 1 M/L or $LiPF_4$ in dimethyl carbonate. In more detail, metal oxide particles are dispersed in thus prepared non-aqueous solution in an amount of 0.5 M/L, and a standard battery is manufactured using thus prepared dispersion, a reference electrode, a counter electrode of metal foil, and a working electrode of platinum metal The voltage at which 0.1 mA is detected by scanning the potential in the range of ±0 V–+4.5 V at a 10 mV/sec is indicated as the oxidation potential.

The metal oxide particles preferably show a pH value in the range of 8 to 12. The pH value is determined by the method defined in JIS K.5101.24. The pH value of this range is effective to fix impurities contained in the battery onto the metal oxide particles. The metal oxide particles can be treated by an alkaline agent such as an aminosilane coupling agent so that the surfaces of metal oxide particles can show such preferred pH level. Further, the metal oxide particles preferably show a water-absorbing capacity in the range of 1 to 5%, so as to fix water onto their surfaces in the battery. The water-absorbing capacity is determined by a weight increase which is measured after storing the particles at 90%RH for 24 hours.

The metal oxide particles preferably contain almost no components which are soluble or swell in the non-aqueous solution in the secondary battery.

The metal oxide particles have a mean diameter in the range of 0.1 to 10 $\mu$m, preferably 0.1 to 8 $\mu$m, more preferably 0.5 to 3 $\mu$m, and a true specific gravity of 1.5 or more, particularly 2 or more.

The metal oxide particles are incorporated in the porous film in a weight concentration of 100 to 40,000 ppm, preferably 100 to 10,000, more preferably 100 to 5,000, particularly preferably 300 to 3,000 ppm.

The metal oxide particles can be incorporated in a resin material by any of known methods. Typically, the metal oxide particles are mixed and kneaded with a resin material using a monoaxial extruder, a biaxial extruder, or a mixing roller to give pellets containing the particles in the resin material. A Henschel mixer and a tumbler may be also employed.

The resin film in which the metal oxide particles can be prepared by a known method such as a melt extruding method using a T-die or an inflation method. The extruding method using a T-die can be conducted at a temperature higher than that of the melting temperature of the resin material by 20 to 60° C., a draft ratio of 5 to 500, preferably 5 to 300, and a collecting rate of 10 to 50 m/min.

Generally, the resin film containing the metal oxide particles is then heat-treated so as to increase its crystallinity and orientation. The heat-treatment may be performed at 110 to 130° C., preferably 110 to 125° C., for a polyethylene film and at 110 to 160° C., preferably 120 to 150° C., for a polypropylene film, for a period of 3 to 180 seconds. Thus heat-treated polyethylene film preferably has a birefringence of $25 \times 10^{-3}$ to $48 \times 10^{-3}$, more preferably $30 \times 10^{-3}$ to $45 \times 10^{-3}$, and preferably shows an elastic recovery of 40 to 80%, more preferably 50 to 75%, at 50% elongation of the film. The heat-treated polypropylene film preferably has a birefringence of $10 \times 10^{-3}$ to $25 \times 10^{-3}$, more preferably $12 \times 10^{-3}$ to $23 \times 10^{-3}$, and preferably shows an elastic recovery of 70 to 94%, more preferably 75 to 93%, at 100% elongation of the film. The birefringence, elastic recovery values, and other characteristics are determined in the manner described in EP 0 823 740 A1. The content of EP 0 823 740 A1 is incorporated in the present specification as reference.

The porous resin structure of the battery separator can be formed in the resin film by any of known methods such as a film stretching method (dry method) or an extrusion method (wet method).

The stretching method is performed by a stretching a resin film so as to produce in the film creases and subsequently to form pores.

The extraction method is performed by subjecting a resin composition film containing fillers and/or additives (e.g., plasticizer) to extraction for removing the contained fillers and/or additives from the film by dissolution.

A representative structure of the battery separator of the invention is a structure comprising a combined three-layered film composed of one porous resin (particularly, polyethylene) film containing no solid particles and a pair of the porous resin (particularly, polypropylene) films having the metal oxide particles in which the porous resin film containing no solid particles is placed between a pair of the porous resin films having the metal oxide particles. Accordingly, the following description is mainly addressed to the preparation of a battery separator of the combined three-layered film.

Two polypropylene film containing the metal oxide particles are prepared in the manner described above, and separately a polyethylene film containing no solid particles such as the metal oxide particles is prepared. Each of thus prepared three resin films are independently drawn from their rolls and placed such manner that the polyethylene film is sandwiched by a pair of the polypropylene films. Thus formed film composite is pressed under heating to combine the polyethylene film with each of the adjacent polypropylene films so that a united film composite is produced. The pressing procedure under heating is preferably performed under such condition as to essentially keep the birefringence and elastic recovery of each film component. The heating is preferably performed at 110 to 130° C., more preferably 115 to 125° C., and the pressure generally is in the range of 1 to 3 kg/cm$^2$. The film composite is preferably drawn at a rate of 0.5 to 8 m/min. The united film composite preferably has a peel strength of 0 to 60 g/15 mm.

The united film composite is then stretched to form a porous structure in each of the film component. The stretching is generally performed first at a low temperature (e.g., −20 to 50° C., preferably 20 to 35° C.) and then at a high temperature (e.g., 70 to 130° C., preferably 100 to 125° C., and a temperature higher than the temperature of the low temperature stretching by 40–100° C.). The stretching is attained by difference of a rotation rate between a roll having the unstretched film composite and a roll for collecting the stretched film composite. The low temperature stretching is performed preferably to give a stretching ratio (i.e., draft ratio) of 5 to 200%, preferably 10 to 100%, and the high temperature stretching is performed preferably to give a stretching ratio of 100 to 400%. Details of the draft ratio is described in the aforementioned EP 0 823 740 A1.

The stretching of the united film composite produces a great number of micropores in each of the film component. Thus produced porous film composite is then kept at an appropriate temperature so as to make the porous structure stable, that is, heat-fixing. The heat-fixing is also described in EP 0 823 740 A1. Thus, a porous battery separator of the invention is produced.

The porous battery separator of the invention preferably has a thickness of 5 to 100 μm, preferably 20 to 40 μm, a gas permeation of 30 to 1,000 sec./100 cc, more preferably 30 to 800 sec./100 cc, most preferably 100 to 700 sec./100 cc, a maximum pore diameter of 0.02 to 3 μm, a pore volume of 30 to 85%, and a thickness of 5 to 100 μm. In the porous film containing the metal oxide particles of the porous battery separator of the invention, it is preferred that the particles of metal oxide are dispersed in the porous resin matrix in a ratio of 50 to 5,000 particles/mm$^2$, particularly 100 to 3,000 particles/mm$^2$.

The porous battery separator of the invention is favorably employed as a battery separator in a lithium secondary battery comprising a positive electrode comprising a lithium-containing metal compound, and a negative electrode comprising carbonaceous material. The lithium secondary battery is well known in its structure, its composition, and other factors. The porous battery separator of the invention can be incorporated in lithium secondary batteries of any types.

A representative example of the lithium secondary battery employing the battery separator of the invention is described below.

A positive electrode composition is produced by mixing 80 wt. % of LiCoO$_2$ (positive electrode component), 10 wt. % of acetylene black (electroconductive component), and 10 wt. % of poly(vinylidene fluoride) (binder). Thus produced positive electrode composition is then mixed with 1-methyl-2-pyrrolidone (solvent) to give a coating dispersion. The coating dispersion is coated on an aluminum foil, dried, pressed, and heated to give a positive electrode sheet.

A negative electrode composition is produced by mixing 90 wt. % of a graphite (negative electrode component) and 10 wt. % of poly(vinylidene fluoride) (binder). Thus produced negative electrode composition is then mixed with 1-methyl-2-pyrrolidone (solvent) to give a coating dispersion. The coating dispersion is coated on a copper foil, dried, pressed, and heated to give a negative electrode sheet.

The positive electrode sheet, a battery separator of the invention, and the negative electrode sheet are laminated in order and coiled. The coiled produce is placed in a battery case, and a non-aqueous electrolytic solution is then placed in the battery case. Thus, a cylindrical lithium secondary battery (diameter: 18 mm, height: 65 mm) is manufactured.

The present invention is further described by the following non-limiting examples.

EXAMPLE 1

Particles of inorganic material comprising silicon oxide as main component (mean diameter: 2.1 μm, true specific gravity: 2.36) were mixed with polypropylene (number average molecular weight: 70,000, crystallizing temperature: 112° C.) in an amount of 2,000 ppm (based on the weight of polypropylene) in a biaxial kneader. The particles showed an oxidation potential of higher than +4.5 V, as compared with that of lithium.

The inorganic material containing-polypropylene mixture was extruded from a T-die (extruding width: 1,000 mm, extruding slit opening: 2 mm) to give a film. The film was then collected by a cooling roll (kept at 80° C.), and an air of 25° C. was applied to the collected film. Thus cooled film was drawn at a rate of 50 m/min., to give a polypropylene mixture film of 11.4 μm thick. The mixture film was heat treated at 135° C. for 60 sec., under the condition that the film was fixed in the drawing direction, and allowed to stand until the temperature reached room temperature. Thus processed polypropylene mixture film (non-stretched) had a birefringence of 22.6×10$^{-3}$ and an elastic recovery (100% elongation) of 93%.

A high density polyethylene (number average molecular weight: 20,000, specific density: 0.964, melting point 134° C.) mixture was extruded from a T-die (extruding width: 1,000 mm, extruding slit opening: 2 mm) to give a polyethylene film. The film was then collected by a cooling roll (kept at 117° C.), and an air of 25° C. was applied to the collected film. Thus cooled film was drawn at a rate of 20 m/min., to give a polyethylene film of 9.5 μm thick. The polyethylene film was heat treated at 120° C. for 60 sec., under the condition that the film was fixed in the drawing direction, and allowed to stand until the temperature reached room temperature. Thus processed polyethylene film (non-stretched) had a birefringence of 35.5×10$^{-3}$ and an elastic recovery (50% elongation) of 52%.

The polyethylene film and a pair of the polypropylene films were drawn from their rolls simultaneously at a drawing rate of 6.5 m/min., so as to give a structure in which the polyethylene film was placed between a pair of the polypropylene mixture films. Thus formed film composite was supplied to a heating roll and pressed at a temperature of 120° C. and at a linear pressure of 1.8 kg/cm. The film composite having been pressed under heating was collected at the same rate by a cooling roll (kept at 50° C.) at a tension of 0.9 kg. Thus produced united film composite (unstretched) had a thickness of 31.6 μm.

The united film composite was stretched between two rolls kept at 30° C. to carry out a low temperature 25% stretching. The two rolls were arranged under such condition that one roll was placed apart from another roll at a distance of 250 mm. The drawing roll was operated at a rotation rate of 2 m/min.

The united film composite having been submitted to the low temperature stretching was subsequently introduced into an air-circulating oven heated to 123° C. In the oven, the united film composite was subjected to a high temperature stretching to give a total draft ratio of 180%, and then relaxed and thermally fixed for 72 sec. on a roll heated 123° C. Thus, a three-layered porous film, that is, a battery separator of the invention, was produced.

The thickness, gas permeation, maximum pore diameter, pore volume, pencil hardness, micro surface hardness, and breakdown voltage of the resulting battery separator were measured by the under-mentioned methods and are set forth in Table 1.

1) Gas permeation:
   measured according to JIS P8117, and expressed in terms of Gurley Number
2) Maximum pore diameter and pore volume:
   measured using a mercury porosimeter
3) Pencil hardness:
   determined in the known manner using commercially available pencils
4) Micro surface hardness:
   A pressing ball (diameter: 500 μm) was placed on the separator fixed on a substrate at a rate of 0.04 gf/sec., until the pressure reached 5 gf. The ball was held under the condition for 5 seconds. The hardness index was calculated from the depth of concave formed on the separator using the following equation:

Hardness index=weight×2/concave depth/π(ratio of circumference of circle to diameter)

5) Breakdown voltage:
   determined according to JIS C2110

Further, the battery separator was rubbed with a metal plate having a ground surface (surface roughness (Ra): 0.3 μm) under a weight of 40 kgf/cm² and at a moving rate of 300 mm/min. The surface conditions of the battery separator after the rubbing procedure are seen in the microscopic photograph of FIG. 1. Apparently, almost no abrasion was observed.

COMPARISON EXAMPLE 1

The procedures of Example were repeated except that no metal oxide particles were incorporated into the polypropylene films.

The thickness, gas permeation, maximum pore diameter, pore volume, pencil hardness, micro surface hardness, and breakdown voltage of the resulting battery separator were measured and are set forth in Table 1.

Figure 2:
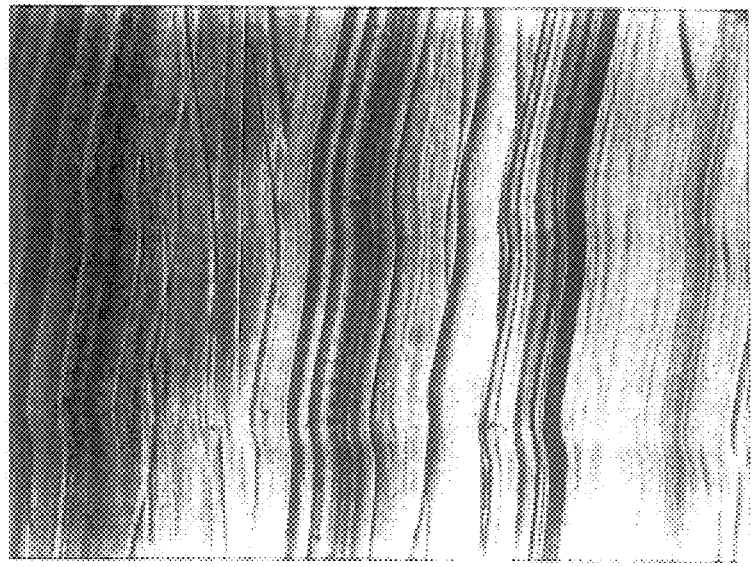
FIG. 2. indicates a photographic picture of a surface of a battery separator for comparison which has been subjected to the same rubbing test.

Further, the rubbing test was performed on the produced battery separator. The surface conditions of the battery separator after the rubbing procedure are seen in the microscopic photograph of FIG. 2. Apparently, a great number of abrasions were observed.

TABLE 1

|  | Example 1 | Comparison Ex. 1 |
|---|---|---|
| Film thickness (μm) | 26.3 | 25.4 |
| Gas permeation (sec./100 cc) | 533 | 577 |
| Maximum pore diameter (μm) | 0.12 | 0.12 |
| Pore volume (%) | 41.1 | 41.9 |
| Pencil hardness | 4B | 4B |
| Micro surface hardness | 8.7 | 6.4 |
| Breakdown voltage (kV) | 1.99 | 1.75 |

EXAMPLE 2

In this example, adsorption of stearic acid (which was sometimes liberated from calcium stearate generally contained in polypropylene and polyethylene as a stabilizer) by metal oxide particles was evaluated.

In chloroform was dissolved stearic acid to give a 600 ppm solution. To the solution were added particles of silicon dioxide (mean diameter: 2.1 μm, pH 10.7, water absorbing capacity: 3%) to give a dispersion of a concentration of 5,000 ppm. The dispersion was stirred at room temperature for one hour. After the stirring was complete, the particles were removed by filtration. The solvent was then analyzed by means of gas chromatography to detect stearic acid remaining in the solvent.

The results are as follows:
Concentration of stearic acid:
   Before addition of $SiO_2$ particles 575 ppm
   After stirring with $SiO_2$ particles 304 ppm

EXAMPLE 3—COMPARISON EXAMPLE 2

The procedures of Example 1 and Comparison Example 1 were repeated to produce a battery separator of the invention and a battery separator for comparison.

The characteristics of the produced battery separators are set forth in Table 2.

TABLE 2

|  | Example 3 | Comparison Ex. 2 |
|---|---|---|
| Film thickness (μm) | 25.7 | 25.4 |
| Gas permeation (sec./100 cc) | 530 | 560 |
| Maximum pore diameter (μm) | 0.12 | 0.11 |

EXAMPLE 4—COMPARISON EXAMPLE 3

A cylindrical lithium secondary battery was produced using $LiCO_2$ (positive electrode material), graphite (MCF available from Petka Corporation, negative electrode material), a battery separator of Example 3 or Comparison Example 2, and an non-aqueous electrolytic solution ($LiPF_6$ in a mixture of ethylene carbonate and methyl ethyl carbonate at volume ratio of 3/7 at a concentration of 1 M/L).

The lithium secondary battery was charged at room temperature (20° C.) with a constant electric current and a constant voltage of 1,400 mA (1C) to reach 4.2 V and then charging was continued under constant voltage of 4.2 V. Subsequently, the battery was discharged to give a constant electric current of 1,400 mA. The discharge was continued to give a terminal voltage of 2.7 V. The charge-discharge capacity was repeated 200 cycles and further to reach 300 cycles total. The discharge capacity retention are set forth in Table 3.

The lithium secondary battery was charged at room temperature (20° C.) with a constant electric current and a constant voltage of 1,400 mA (1C) to reach 4.2 V and then charging was continued under constant voltage of 4.2 V. Subsequently, the battery was discharged at −20° C. to give a constant electric current of 560 mA (0.4C) or 1,400 mA (1C). The discharge was continued to give a terminal voltage of 2.7 V.

A ratio (%) of discharge capacity was calculated from the obtained discharge capacity based on the initial discharge capacity under a constant electric current of 1,400 mA.

TABLE 3

|  | Example 4 | Comparison Ex. 3 |
|---|---|---|
| Discharge capacity retention (%) | | |
| 200 cycles | 90.1 | 88.6 |
| 300 cycles | 86.2 | 84.5 |
| Ratio of discharge capacity (%) | | |
| at 560 mA (0.4C) | 65.7 | 62.3 |
| at 1400 mA (1C) | 18.1 | 13.8 |

What is claimed is:

1. A battery separator comprising one porous resin film containing no solid particles and a pair of porous resin films in which 100 to 40,000 ppm of solid particles having a mean diameter in the range of 0.1 to 10 $\mu$m are dispersed in a porous resin matrix, the solid particles comprising at least one metal oxide selected from the group consisting of silicon dioxide, aluminum oxide, magnesium oxide, zinc oxide, and metal oxides containing at least two metal elements selected from the group consisting of Si, Al, Mg and Zn and having an oxidation potential of +4.5V or more as compared with that of lithium, under the condition that the porous resin film containing no solid particles is placed between the pair of porous resin films having the particles of metal oxide.

2. The battery separator of claim 1, wherein the particles have a mean diameter in the range of 0.1 to 8 $\mu$m.

3. The separator of claim 1, wherein the particles are dispersed in the resin matrix in an amount of 100 to 5,000 ppm.

4. The battery separator of claim 1, wherein the particles have a mean diameter in the range of 0.5 to 3 $\mu$m.

5. The battery separator of claim 1, which has a gas permeation of 30 to 1000 sec./100 cc, a maximum pore diameter of 0.02 to 3 $\mu$m, a pore volume of 30 to 85%, and a thickness of 5 to 100 $\mu$m.

6. The battery separator of claim 5, which has a gas permeation of 30 to 800 sec./100 cc.

7. The battery separator of claim 1, wherein the porous resin matrix comprises polyolefin.

8. The battery separator of claim 1, wherein the porous resin matrix comprises polyethylene, polypropylene, or ethylene-propylene copolymer.

9. The battery separator of claim 1, in which the particles of metal oxide are dispersed in the porous resin matrix in a ratio of 50 to 5,000 particles/mm$^2$.

10. The battery separator of claim 1, which the particles of metal oxide are dispersed in the porous resin matrix in a ratio of 100 to 3,000 particles/mm$^2$.

11. The battery separator of claim 1, the porous film containing no solid particles comprises polyethylene as its resin matrix and the porous resin films having the particles of metal oxide comprises polypropylene as its resin matrix.

12. A lithium secondary battery comprising a positive electrode comprising a lithium-containing metal compound, a negative electrode comprising carbonaceous material, and a battery separator of claim 1.

* * * * *